Nov. 1, 1960 R. W. WAGNER 2,958,225
POWER TAKE-OFF HAVING AN INTERLOCK WITH FLUID TRANSMISSION
Filed Aug. 10, 1954 2 Sheets-Sheet 2
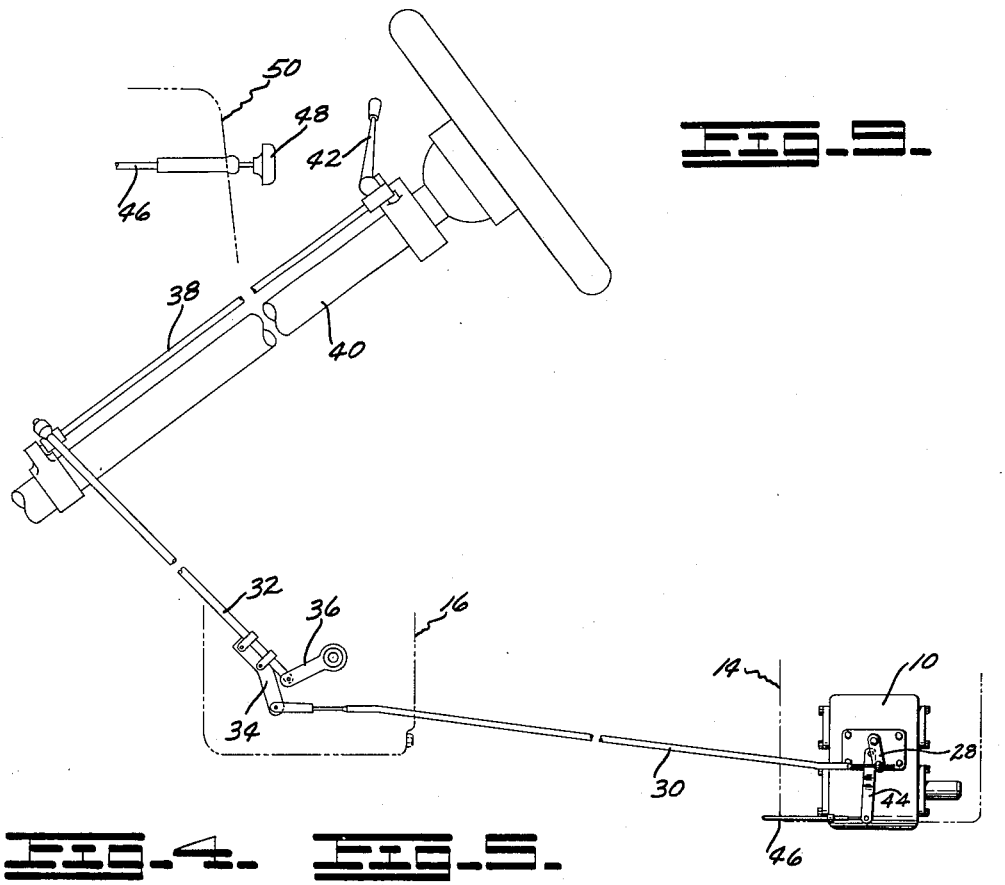
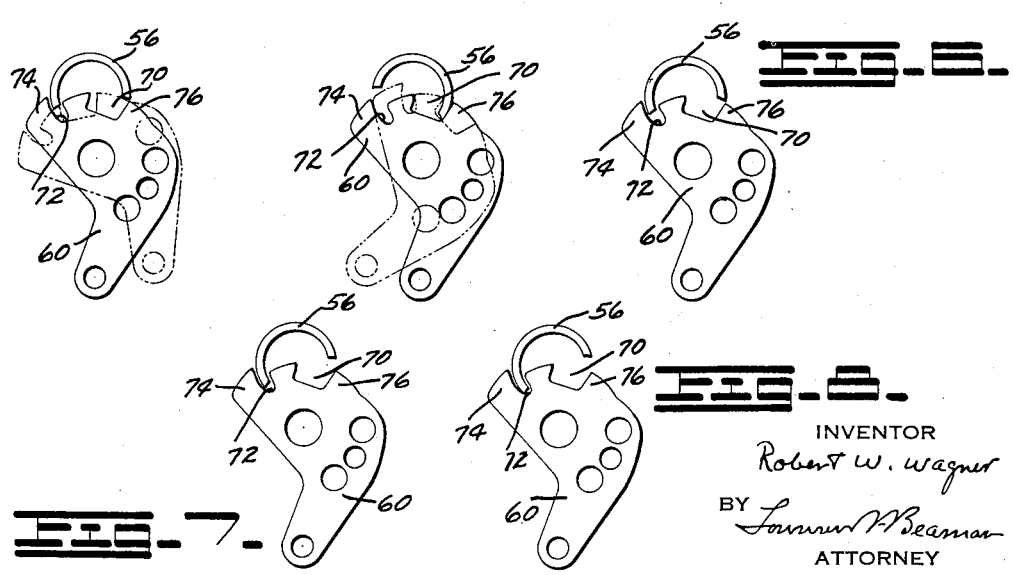
INVENTOR
Robert W. Wagner
BY
ATTORNEY

United States Patent Office 2,958,225
Patented Nov. 1, 1960

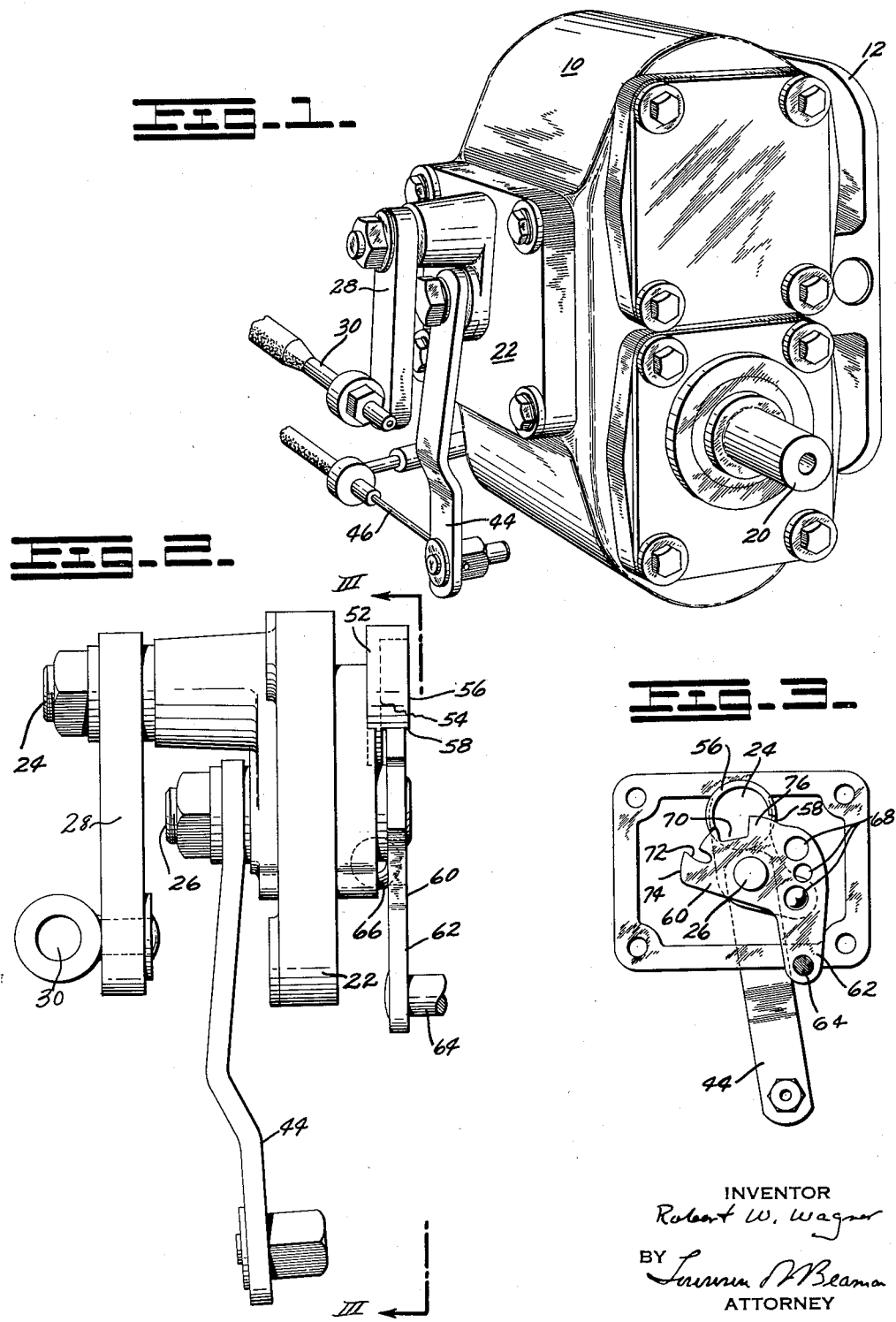

2,958,225

POWER TAKE-OFF HAVING AN INTERLOCK WITH FLUID TRANSMISSION

Robert W. Wagner, Chelsea, Mich., assignor to Dana Corporation, Toledo, Ohio, a corporation of Virginia Filed Aug. 10, 1954, Ser. No. 448,959

3 Claims. (Cl. 74—15.4)

The present invention relates to improvements in power take off mechanism upon vehicles such as trucks, tractors, buses and the like in which power transmission and power take off structure is imposed between the prime mover of the vehicle and the differential drive to the wheel. In practice, the power take off structure may be mounted upon an auxiliary gear box located between the transmission directly associated with the prime mover and the differential drive to the rear wheel. This arrangement is particularly well suited to fluid transmission but it may result in damage to the power take off structure if it is not in neutral during high speed operation of the vehicle.

According to the invention, I propose to provide an intterlock between the power take off shifter mechan.sm and the selector mechanism of the vehicle transmission for driving the wheel. In the preferred form, the power take off would be locked in its neutral position and may not be shifted with the vehicle transmission in one or more high gear positions. With the vehicle transmission in low gear or reverse, the interlocking structure permits shifting of the power take off structure from its neutral position.

Thus an object of the invention is to provide an improved interlocked control for vehicle power transm.ssion systems wherein the drive to the wheels and to an auxiliary power take off mechanism is through an auxiliary transmission driven off the main transmission of the prime mover of the vehicle.

Another object is to provide a power take off mechanism having a safety lock out for the shifter structure.

A further object is to provide an adapter safety lock out and shifter structure for power take off units.

These and other objects and advantages residing in the combination, construction, and arrangement of component parts will more fully appear from a consideration of the following specifications and the appended claims.

In the drawings,

Fig. 1 is a perspetcive view of a power take off unit equipped with the present invention, Fig. 2 is a side elevational view of the adapter safety lock out and shifter structure shown removed from the power take off unit, Fig. 3 is a view of Fig. 2 taken on the line III—III as indicated in Fig. 2, Figs. 4 to 8 inclusive are diagrammatic views of the safety lock out and shifter structure in various positions of operation, and Fig. 9 is a diagrammatic view of the relative location and association of the transmission, auxiliary gear box, power take off unit and the safety lock out and shifter control.

As more particularly shown in Figs. 1 and 9, the power take off unit 10 has a mounting flange 12 for bolting the unit 10 to the side of a suitable auxiliary gear box 14 and meshing therewith in a well known manner, the gear box 14 being located between the transmission 16 and the differential of the vehicle, the arrangement being common in trucks, buses and the like for reducing the ratio between the main transmission 16 and the differential drive to the rear wheels.

The power take off unit 10 may be of any well known construction as for example the type disclosed in my Patent No. 2,578,867, issued December 18, 1951, wherein a shifter shaft is rocked for sliding the gear into and out of suitable positions to render the power take off shaft 20 active and inactive.

In the adaptation of the present invention to power take off units of the type disclosed in the aforesaid patent, this has been readily accomplished through an adapter plate 22 bolted to the side of the casing of the unit 10. This plate carries a control shaft 24 and a shifter shaft 26. An arm 28 is fixed to the shaft 24 and is connected by a rod 30 to the rod 32 by an adapter clamp 34. Rod 32 is connected to the rock shaft 36 of the fluid transmission 16, the rod 32 being actuated through the rotation of the rod 38, on the steering wheel column 40, through the selector lever 42 all in a well known manner as now employed upon vehicles equipped with fluid transmission such as "Hydra-matic" and the like.

Shifter shaft 26 of the unit 10 has fixed thereto an arm 44 connected through a control wire 46 to a push-pull control member 48 on the dash 50.

The interlock between the selector 42 and the control member 48 is accomplished in the illustrated form of the invention structures through the following structure: Shaft 24 at its right hand end as viewed in Fig. 2 has an enlarged diameter at 52. An annular recess 54 is machined in the end face of the shaft 24 to provide a rim 56, as shown in Fig. 3. Rim 56 is interrupted by a radial slot 58 which gives the rim 56 a generally semi circular shape.

Fixed to the right hand end, as viewed in Fig. 2, of the shifter shaft 26, is a plate 60 having an arm portion 62 which carries the part 64 for sliding the gears of the unit 10 into and out of meshing for rendering the shaft 20 active and inactive. A spring stressed ball 66 carried in the plate 20 selectively engages the holes 68 in the plate 60 to hold the plate 60 in different positions of adjustment all in a well known manner.

As shown in Fig. 2, the plate 60 is disposed in the plane of the rim 56 on the shaft 24 so that upon relative movement their paths intersect due to the relative shapes of the rim 56 and the plate 60.

Referring to Fig. 3 the plate 60 has an irregular upper edge which in the illustrated form comprises notches 70 and 72 and an abutment 74. Generally stated, the shape of the rim 56 or equivalent structure on the shaft 24 and the shape of the plate 60 or equivalent structure, is such that when the gear box 14 is being driven by the transmission 16 at a speed or in a direction which would be detrimental to the unit 10 or associated structure, the plate 60 must have first been shifted into a safety position by the control member 48 before the selector lever 42 may be actuated to effect the condition of detrimental speed or direction. Likewise, when the selector lever 42 is in a position to effect the condition of detrimental speed or direction, the shape of the rim 56 or equivalent structure and the shape of the plate 60 or equivalent structure is such that the control member 48 can not actuate unit 10 to its detriment or to the detriment of associated structure.

In Fig. 3, the plate 60 is shown shifted by the member 48 into its forward shift position and the shaft 24 is locked in a low speed position for the reason that rocking of the shaft 24 in either direction by the selector 42 is prevented by interference between the rim 56 and the upper edge of the plate 60. When the plate 60 is rocked from the forward shift position shown in dotted outline in Fig. 4 to the neutral shift position shown in Fig. 4 in solid outline, the rim 56 has clearance for rocking movement into the notches 70 and 72. Thus if the shaft 24 is rocked clockwise as shown in Fig. 5 into its reverse position, the rim 56 enters the notch 70 to prevent the plate 60 from being shifted into its forward shift position yet permit the plate 60 to be rocked into the reverse shift position shown in dotted outline.

In Fig. 6, the plate 60 is shown locked in its neutral shift position, with the power take off unit 10 inactive, when the selector 42 has moved the shaft 24 into an intermediate speed position rocking the rim 56 counter clockwise partially into the narrow notch 72. Fig. 7 shows the shaft 24 rocked into a high speed position which moves the rim 56 further into the notch 72 and continues to lock the plate 60 and the unit 10 in its neutral position. In Fig. 8, further counter clockwise rocking of the shaft 24 and rim 56 through the selector 42 is shown bringing the transmission 16 into its neutral position and locking the plate 60 and the unit 10 in its neutral position. Thus in the illustrated arrangement of Figs. 6, 7, and 8, with the selector 42 positioning the rim 56 within the notch 72, the plate 60 is locked in neutral position and cannot be shifted from that position by the member 48. In Fig. 4, with the rim 56 in the low speed position of the selector 42, the plate 60 may be rocked back and forth between forward and neutral position by the member 48, the abutment 74 preventing rocking of the plate 60 into the reverse position. With the selector 42 positioning the rim 56 in the reverse position of the transmission 16, the rim 56 is located in the wide notch 70 which will enable the plate 60 to rock between reverse and neutral with the abutment 76 preventing the plate 60 from being rocked into its forward position.

It will be further noted that with the plate 60 in the forward shift position shown in dotted outline in Fig. 4, the shaft 24, rod 30, rod 32 and selector 42 are all locked against actuation from the low speed position. Also with the plate 60 in its reverse shift position, the rim 56, which is in its extreme clockwise position, cannot be rocked counter clockwise because of interference with the abutment 74 and thus the shaft 24, rod, 30, rod 32 and selector 42 are all locked against actuation from the reverse position of the transmission 16.

From the foregoing description it should be apparent to those skilled in the art that an interlock has been provided between the rim 56 and the plate 60 which controls the sequence of operation of the transmission selector 42 and the power take off member 48.

Having thus described my invention what I claim as new and desire to cover by Letters Patent is:

1. A power take-off unit having power train elements comprising means for operably connecting said unit to a speed selector controlled transmission, a rockable shaft mounted on said unit for shifting the power train elements of said unit between engaged and disengaged positions, a second rockable shaft mounted upon said unit operably connected to the speed selector for the transmission and interlocking structure associated with said rockable shafts having portions with intersecting paths for controlling the sequence of actuation of said shafts.

2. In combination with a power take-off unit adapted to be driven from a transmission controlled by a selector mechanism, a casing, an opening defined therein, an adapter control plate for said power take-off unit comprising a plate to be mounted upon the casing of the unit as a cover for said opening, a pair of spaced parallel rock shafts mounted in said plate, one of said shafts carrying a shifting member for said unit, the other of said shafts being connectable to the selector mechanism for the transmission driving the unit, and interlocking means upon said shafts having intersecting paths for regulating the sequence of actuation of said shafts.

3. In combination with a vehicle having a fluid transmission, a power take-off unit driven by said transmission, a shifter for said unit and a speed selector for said transmission, first means having spaced ends and operably connected at one end to said selector and actuated by movement of said selector, the other end of said first means being disposed adjacent said unit and having abutment means connected thereto and actuated by movement of said first means and second means associated with said shifter and movable therewith for interlocking with said abutment means to control the sequence of operation of said selector with respect to said shifter.

References Cited in the file of this patent

UNITED STATES PATENTS

| | | |
|---|---|---|
| 1,938,848 | Matthews | Dec. 12, 1933 |
| 2,034,778 | Storey | Mar. 24, 1936 |
| 2,100,677 | Wagner | Nov. 30, 1937 |
| 2,363,979 | Land | Nov. 28, 1944 |
| 2,438,539 | Cook | Mar. 30, 1948 |
| 2,637,221 | Backus | May 5, 1953 |
| 2,690,684 | Stemler | Oct. 4, 1954 |
| 2,853,889 | Quayle | Sept. 30, 1958 |